(No Model.)  2 Sheets—Sheet 2.

H. AIKEN.
INGOT EXTRACTOR.

No. 526,095. Patented Sept. 18, 1894.

WITNESSES
Thomas W. Bakewell
H. L. Gill

INVENTOR
Henry Aiken

UNITED STATES PATENT OFFICE.

HENRY AIKEN, OF PITTSBURG, PENNSYLVANIA.

INGOT-EXTRACTOR.

SPECIFICATION forming part of Letters Patent No. 526,095, dated September 18, 1894.

Application filed April 14, 1894. Serial No. 507,548. (No model.)

*To all whom it may concern:*

Be it known that I, HENRY AIKEN, of Pittsburg, in the county of Allegheny and State of Pennsylvania, have invented a new and useful Improvement in Ingot-Extractors, of which the following is a full, clear, and exact description, reference being had to the accompanying drawings, in which—

Figure 1:
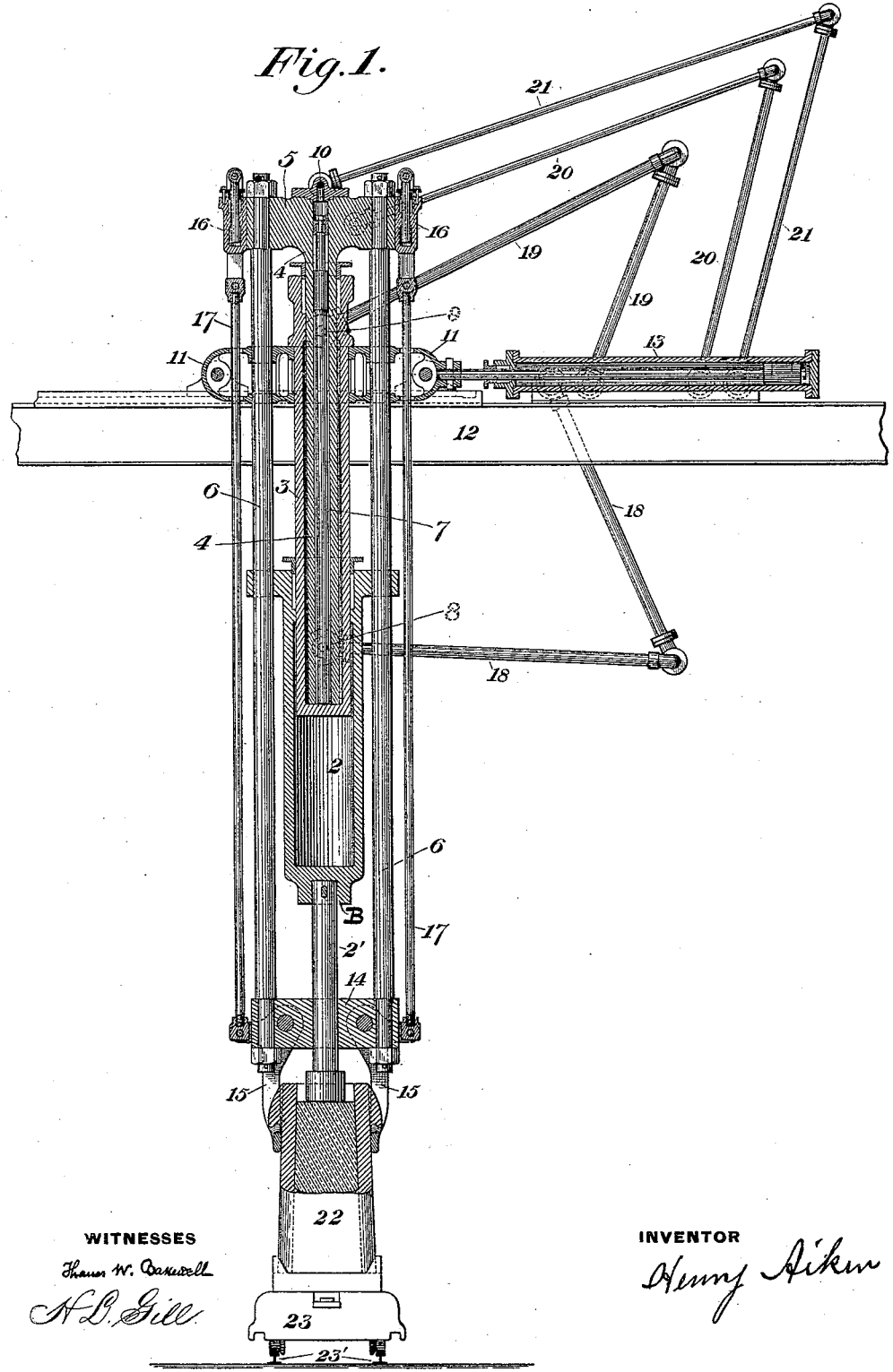
Figure 2:
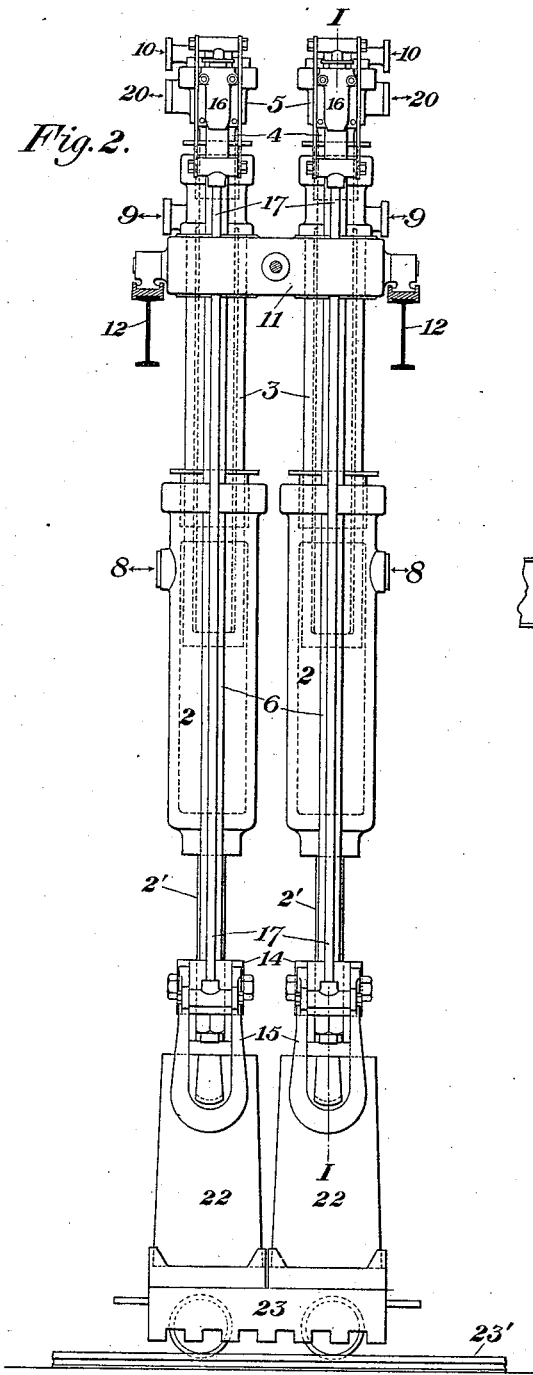
Figure 3:
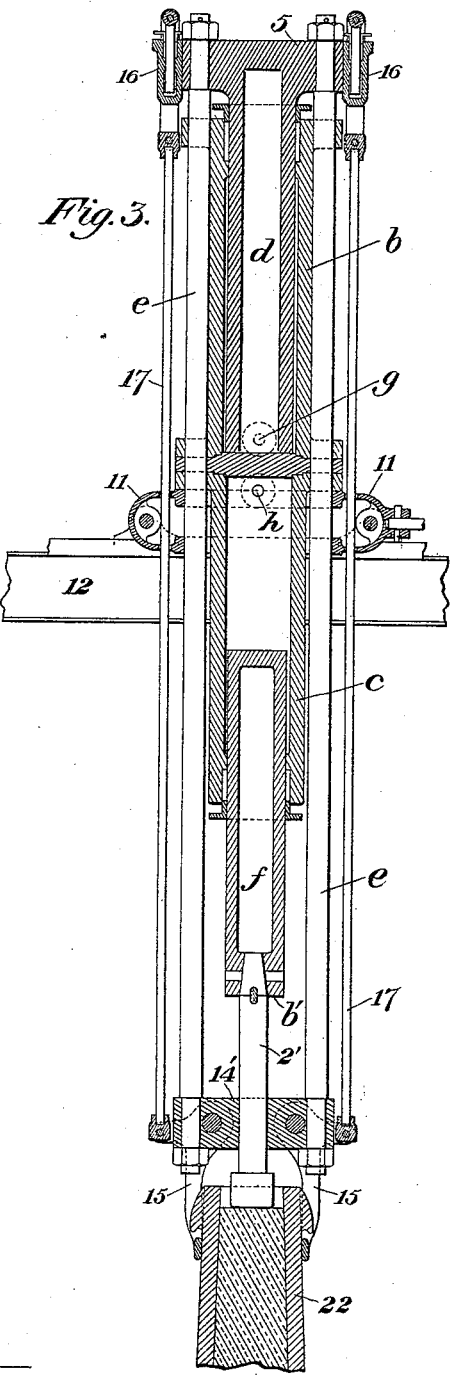

Figure 1 is a vertical section on the line I—I of Fig. 2. Fig. 2 is a side elevation. Fig. 3 is a vertical section of a modification.

My invention is an improvement upon the ingot-extracting apparatus described and claimed in Letters Patent No. 439,828, granted to me on November 4, 1890.

In Fig. 1 of the drawings, 2 represents an upright movable cylinder, constructed to act in the manner of a plunger, having a downwardly projecting post or ram 2', adapted to engage an ingot while the mold is being stripped therefrom as hereinafter described. The plunger 3 extends upwardly from the cylinder, and is made hollow so that it also may serve as a cylinder with relation to a plunger 4 which projects from its upper end, and is provided with a cross-head 5, from which extend upright hangers or rods 6, connecting the plunger 4 with the mold-suspending devices hereinafter described. The plunger 4 is also hollow and serves as a cylinder with relation to an interior downwardly projecting plunger 7, the function of which is to act as a counterbalancing mechanism, for which purpose the water pressure is maintained continually within the cylinder 4 and exerts constant lifting force thereon.

8, 9 and 10 are the water inlets for the cylinders 2, 3 and 4 respectively. The cylinder 3, which in action does not normally move in a vertical direction, is supported by a shoulder upon a trolley 11, mounted on an elevated platform or jib 12 and adapted to be moved back and forth thereon by means of a hydraulic cylinder 13. At the lower end of the hangers 6 is a head 14 to which are pivoted the levers of tongs 15, adapted to grasp and to support an ingot-mold. These tongs are operated positively by means of cylinders 16, on the cross-head 5, whose plungers are connected by rods 17 to projecting arms of the tongs-levers, so that by manipulation of the valves of the cylinders 16, the tongs can be opened and closed at the will of the operator.

18, 19, 20 and 21 are flexible water-connections which lead to the water inlets of the cylinders above named; supplying water thereto without interfering with the back and forth motion of the trolley.

The operation of the apparatus when thus constructed is as follows:—The molds 22 containing the ingots to be extracted, are carried to the apparatus in an upright position on the car 23 upon which they are cast, so that the mold shall be directly beneath the cylinder 2, which until then has been upheld by the engagement of the head 14 with a shoulder B on its lower end, the head being drawn up by upward projection of the plunger 4. The mold having been brought into this position, the plunger 4 is lowered as shown in Fig. 1, thus lowering the tongs 15 into position to grasp the usual lugs on the opposite sides of the mold, and permitting the cylinder 2 to descend and to bring the post 2' upon the top of the ingot, and by means of the cylinders 16 the tongs are then closed upon the mold. The valve which connects the pipe 18 of the cylinder 2 with the source of pressure is then closed, and said pipe is connected with an overhead exhaust or waste tank. Water is then admitted to the cylinder 3, the effect of which is to force the plunger 4 upwardly. If the ingot does not stick sufficiently firmly to resist the upward lift of the mold by the plunger 4 and the stop action of the post 2' which rests upon the top of the ingot, such lifting of the plunger 4 will elevate the mold, leaving the ingot standing upon the car, but if the ingot should stick with more than usual tenacity within the mold, and should resist the power above mentioned, the operator manipulates the valve of the pipe 18 so as to connect it with the pressure. Thereupon, the water pressure within the cylinder 2, acting with great force because of the large area of that cylinder, presses upwardly upon the plunger 3, causing it to rise within the trolley, and so augments the upward lift upon the cross-head 5 as to loosen the grip or the mold upon the ingot. As soon as this is done, the connection of the cylinder 2 with the water supply may be cut off, for the action of the cylinder 3 will be sufficient to complete the lifting of the mold as above explained. When the plunger 4 rises sufficiently to lift the head 14 up to the shoulder B of the cylinder 2, the engagement of these parts will raise the cylinder 2 on its plunger 3, displacing the water from the cylinder 2 into the elevated waste tank, and will lift the end of the post or stop 2' from the ingot. When the mold has been lifted clear of the top of the ingot, the trolley is moved on the platform 12 so as to carry the suspended mold over a second car, upon which it is lowered, and by which it is carried back to the casting house. After depositing the mold upon the car, the apparatus is raised and brought back over the track 23' in readiness for repeating on other molds the operations just described.

In practice, it is desirable that the apparatus shown in Fig. 1 should be duplicated as in Fig. 2, two sets of cylinders being set upon a single trolley, so that two molds may be stripped at once, but the operations above described remain the same.

The advantages which result from the construction just described are of great importance. The apparatus is simple, and enables the use of external packing for the cylinder, which is much easier to apply and to keep in repair than internal packing. It is also economical of water, for ordinarily the only water admitted to the apparatus which is not afterward displaced into its reservoir is the water for the mold-lifting cylinder 3, the water pressure being applied to the cylinder 2 only in the event of excessive sticking of the ingot in the mold.

One of the distinguishing features of my invention is that the parts are so constructed that the down-holding cylinder projects into the path of the lifting device which is carried by the upper mold-lifting cylinder, so that after the latter has risen for a part of its stroke it engages the down-holding cylinder and elevates the same.

Within the scope of the invention, the parts of the motors may be reversed, that is to say the moving parts may be made to fit inside or outside the stationary parts as desired. Thus in Fig. 3 I illustrate a modification in which two cylinders, b, c, are set in vertical line with each other, the plunger d of the cylinder b projecting upwardly and carrying the rods or hangers e of the mold-lifting device, while the plunger f of the cylinder c projects downwardly and is adapted to engage the ingot. These cylinders are provided with separate water inlets g and h, and are single acting cylinders. The operation of this device will be readily understood from the foregoing description. After the plunger d has risen in lifting the mold far enough to cause the head 14' to engage a shoulder b' on the plunger f it will lift said plunger.

Within the scope of my invention, the counterbalancing cylinder may be made separate from the other cylinders. The use of the counterbalancing device is of great advantage, since it results in saving of water and in increased economy of the apparatus; but although this is claimed by me specifically herein, it is not essential to my invention as defined in the broader claims, within the scope of which many modifications in form, construction and arrangement may be made.

I claim—

1. In ingot-extracting apparatus, the combination of an upper mold-lifting cylinder and plunger, having means for engaging a mold to be lifted, and a lower down-holding cylinder having a moving part for engaging and holding down the ingot in the mold, said lifting-cylinder carrying means whereby, after the moving part of the lifting cylinder has moved for a part of its stroke it engages and raises the projecting moving part of the down-holding cylinder; substantially as described.

2. In ingot-extracting apparatus, the combination of an upper mold-lifting cylinder and plunger, having its moving part projecting upwardly and carrying mold-lifting devices, and a lower down-holding cylinder having a moving part for engaging and holding down the ingot in the mold, said lifting cylinder carrying means whereby, after the moving part of the lifting cylinder has moved for a part of its stroke it engages and raises the moving part of the down-holding cylinder; substantially as described.

3. The combination with a lifting cylinder and hollow plunger, of a ram set in said plunger, and arranged to counterbalance the same and a fluid pressure inlet adapted to admit fluid into the plunger to act upon the ram and exert a lifting force upon the plunger; substantially as described.

4. The combination with a mold-lifting cylinder and its contained plunger, of a down-holding cylinder which, with the mold-lifting cylinder, forms a coacting cylinder and ram; substantially as described.

5. The combination of the mold-lifting cylinder and plunger 3, 4, having mold-engaging appliances, and a down-holding cylinder 2 on the mold-lifting cylinder; substantially as described.

6. The combination of a mold-lifting motor comprising a cylinder and plunger, tongs carried thereby, and cylinders also carried thereby and connected with the tongs for the purpose of operating the same; substantially as described.

7. The combination of the mold-lifting cylinder and plunger, 3, 4, having mold-engaging appliances, a down-holding cylinder 2 on the mold-lifting cylinder, and water inlets 8 and 9; substantially as described.

8. In ingot-extracting apparatus, the combination of an upper mold-lifting cylinder and plunger, having means for engaging a mold to be lifted, and a lower down-holding cylinder having a moving part for engaging and holding down the ingot in the mold, said lifting-cylinder carrying means whereby, after the moving part of the lifting cylinder has moved for a part of its stroke it engages and raises the projecting moving part of the down-holding cylinder, said cylinders being single acting; substantially as described.

9. In ingot-extracting apparatus, the combination of an upper mold-lifting cylinder and plunger, having means for engaging a mold to be lifted, and a lower down-holding cylinder having a moving part for engaging and holding down the ingot in the mold, said lifting cylinder carrying a head which fits the movable part of the down-holding cylinder and is adapted after the moving part of the lifting cylinder has moved for a part of its stroke to engage a shoulder thereon and to raise the same; substantially as described.

10. In ingot-extracting apparatus, the combination of a mold-lifting cylinder and down-holding cylinder, located one above the other having their moving parts projecting in respectively opposite directions and being single-acting; substantially as described.

In testimony whereof, I have hereunto set my hand.

HENRY AIKEN.

Witnesses:
W. B. CORWIN,
THOMAS W. BAKEWELL.